US009699380B2

(12) United States Patent
Somanath et al.

(10) Patent No.: US 9,699,380 B2
(45) Date of Patent: Jul. 4, 2017

(54) FUSION OF PANORAMIC BACKGROUND IMAGES USING COLOR AND DEPTH DATA

(71) Applicant: INTEL CORPORATION, Santa Clara, CA (US)

(72) Inventors: Gowri Somanath, Santa Clara, CA (US); Christos G. Bampis, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/931,369

(22) Filed: Nov. 3, 2015

(65) Prior Publication Data

US 2017/0126968 A1    May 4, 2017

(51) Int. Cl.
*H04N 5/232* (2006.01)
*H04N 13/02* (2006.01)
(Continued)

(52) U.S. Cl.
CPC ........... *H04N 5/23238* (2013.01); *G06T 3/00* (2013.01); *G06T 7/0081* (2013.01); *G06T 11/60* (2013.01);
(Continued)

(58) Field of Classification Search
None
See application file for complete search history.

(56) References Cited

U.S. PATENT DOCUMENTS

2001/0047435 A1* 11/2001 Dove .................... G06F 9/4443
                                                                 719/310
2007/0237422 A1* 10/2007 Zhou .................. G06K 9/00624
                                                                 382/284
(Continued)

FOREIGN PATENT DOCUMENTS

KR    1020130107840    10/2013

OTHER PUBLICATIONS

Zhang, Fan and Liu, Feng, "Parallax-tolerant Image Stitching", Computer Vision and Pattern Recognition (CVPR), 2014 IEEE Conference on. IEEE, 2014.*
(Continued)

*Primary Examiner* — Anner N Holder
(74) *Attorney, Agent, or Firm* — Finch & Maloney PLLC

(57) ABSTRACT

Techniques are provided for fusion of image frames to generate panoramic background images using color and depth data provided from a 3D camera. An example system may include a partitioning circuit configured to partition an image frame into segments and objects, the segments comprising a group of pixels sharing common features associated with the color and depth data, the objects comprising one or more related segments. The system may also include an object consistency circuit configured to assign either 2D or 3D transformation types to each of the segments and objects to transform them to a co-ordinate system of a reference image frame. The system may further include a segment recombination circuit to combine the transformed objects and segments into a transformed image frame and an
(Continued)

integration circuit to integrate the transformed image frame with the reference image frame to generate the panoramic image.

**24 Claims, 11 Drawing Sheets
(1 of 11 Drawing Sheet(s) Filed in Color)**

(51) Int. Cl.
  *G06T 3/00* (2006.01)
  *G06T 11/60* (2006.01)
  *G06T 7/00* (2017.01)

(52) U.S. Cl.
  CPC ....... *H04N 13/026* (2013.01); *H04N 13/0257* (2013.01); *G06T 2207/10004* (2013.01); *G06T 2207/10024* (2013.01); *G06T 2207/20144* (2013.01); *G06T 2207/20221* (2013.01)

(56) References Cited

U.S. PATENT DOCUMENTS

| | | | |
|---|---|---|---|
| 2010/0097443 A1* | 4/2010 | Lablans | G03B 37/00 348/36 |
| 2011/0069085 A1* | 3/2011 | Weber | G06T 11/60 345/620 |
| 2012/0019613 A1 | 1/2012 | Murray | |
| 2013/0063549 A1 | 3/2013 | Schnyder | |
| 2013/0230237 A1* | 9/2013 | Schlosser | G06T 7/0081 382/164 |
| 2014/0285486 A1 | 9/2014 | Chang | |
| 2014/0321712 A1* | 10/2014 | Ciurea | H04N 13/0242 382/106 |
| 2015/0130638 A1* | 5/2015 | Bahgat | G08G 1/146 340/932.2 |
| 2015/0199839 A1 | 7/2015 | Chon | |
| 2016/0050368 A1* | 2/2016 | Seo | H04N 5/23238 348/36 |

OTHER PUBLICATIONS

Zhang, Fan and Liu, Feng, "Casual Stereoscopic Panorama Stitching", Computer Vision and Pattern Recognition (CVPR), 2015 IEEE Conference on. IEEE, 2015.*

Achanta, Radhakrishna et al., "SLIC Superpixels Compared to State-of-the-art Superpixel Methods", IEEE Transactions on Pattern Analysis and Machine Intelligence, Nov. 2012, vol. 34, pp. 2274-2281.*

Brown, Matthew and Lowe, David G., "Automatic Panoramic Image Stitching using Invariant Features", International Journal of Computer Vision, 2007.*

Newcombe, Richard A. et al., "KinectFusion: Real-Time Dense Surface Mapping and Tracking", IEEE ISMAR, 2011.

U.S. Appl. No. 14/193,934, filed Feb. 28, 2014, 39 pages.

U.S. Appl. No. 14/542,040 (Applicant will provide copy of this unpublished application if would like).

U.S. Appl. No. 14/570,941 (Applicant will provide copy of this unpublished application if would like).

PCT/CN2015/078959 (Applicant will provide copy of this unpublished application if would like).

International Search Report for International Patent Application No. PCT/US2016/051008, mailed Dec. 23, 2016, 4 pages.

* cited by examiner

1000

Receiving a reference image frame and a second image frame, from a camera.
1010

Partitioning the second image frame into segments and objects.
1020

Assigning a transformation type to each of the segments based on a distance of the segment from the camera.
1030

Assigning one of the transformation types to each of the objects based on the assigned transformation types of the segments in the object.
1040

Transforming the objects, using the assigned transformation type, to a co-ordinate system of the reference image frame.
1050

Transforming the segments not included in the objects, using the assigned transformation type, to a co-ordinate system of the reference image frame.
1060

Integrating the second image frame including the transformed objects and transformed segments, with the reference image frame to generate the panoramic background image.
1070

FIG. 10

FUSION OF PANORAMIC BACKGROUND IMAGES USING COLOR AND DEPTH DATA

FIELD OF DISCLOSURE

The present disclosure relates to panoramic images, and more particularly, to fusion of panoramic background images using color and depth data.

BACKGROUND

It is often desirable to create panoramic images from a sequence of photographs. For example, a user may capture a series of two dimensional (2D) images of a scene on a mobile phone or handheld camera, with some overlap between images, by moving or panning the camera in a particular direction. The individual images may then be integrated or stitched together to create the panorama. Similarly, frames from a video sequence that pan over a scene may be subsequently stitched together. Most 2D stitching techniques assume that the scene is sufficiently far from the camera and/or does not contain many depth layers that can generate parallax effects (i.e., an apparent difference in position of an object when viewed from varying angles).

When three dimensional (3D) cameras are used, however, most of the objects of interest in the scene tend to be close to the camera and the scenes in general include objects at multiple depths, making it difficult to stitch frames together. The images provided by 3D cameras are generally composed of pixels providing both color information (e.g., red, green, blue or RGB data) and depth information. Some methods of stitching together 3D images attempt to incorporate the depth information to construct 3D geometric models of parts of the scene, but this often yields poor color and texture rendition. These methods also suffer from the need to collect relatively large quantities of image data over time. Other methods, such as stereoscopic stitching typically produce unacceptable distortion of object shapes when a scene has multiple or complex depth layers.

An additional problem that is encountered when trying to integrate multiple images into a panoramic scene using existing techniques is the inability to deal with dynamic foreground objects against a static background. Moving objects can change shape and position from one image frame to the next, resulting in visually undesirable and confusing results after integration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts, and in which:

FIG. 10 is a flowchart illustrating a methodology for panoramic background image fusion, in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for fusion or integration of multiple image frames to generate a panoramic background image using color (RGB) and depth data provided from a 3D camera. Foreground objects and other visual effects within the given image frames that are not considered part of the background scene can be removed and replaced with background imagery to provide a clean panoramic background image. The techniques are useful in applications that utilize image backgrounds cleaned of any visual effects, such as virtual reality viewing, video editing, and video compositing, to name a few examples. The techniques can be implemented in hardware or software or a combination thereof. In some embodiments, an initial reference image frame is received along with one or more subsequent or new image frames that are offset from, and partially overlap one another. The new image frames are partitioned into regions or segments of related groups of pixels. Objects, made up of one or more of these segments, are also identified. A hybrid 2D/3D transformation is performed on the segments and objects to re-map them to the co-ordinate system of the reference image frame, with reduced distortion achieved by transforming the entire segment or object, as will be explained in greater detail below. Additionally, the image frames may be cleaned by detecting and extracting moving objects and other visual effects not native to the background imagery and replacing those regions of the image with background data obtained from other areas of the given image frame or other image frames. The transformed and cleaned image frames may then be integrated or stitched together along with the reference frame to create the panoramic background image. The panoramic background image can then be used as desired.

Figure 1:
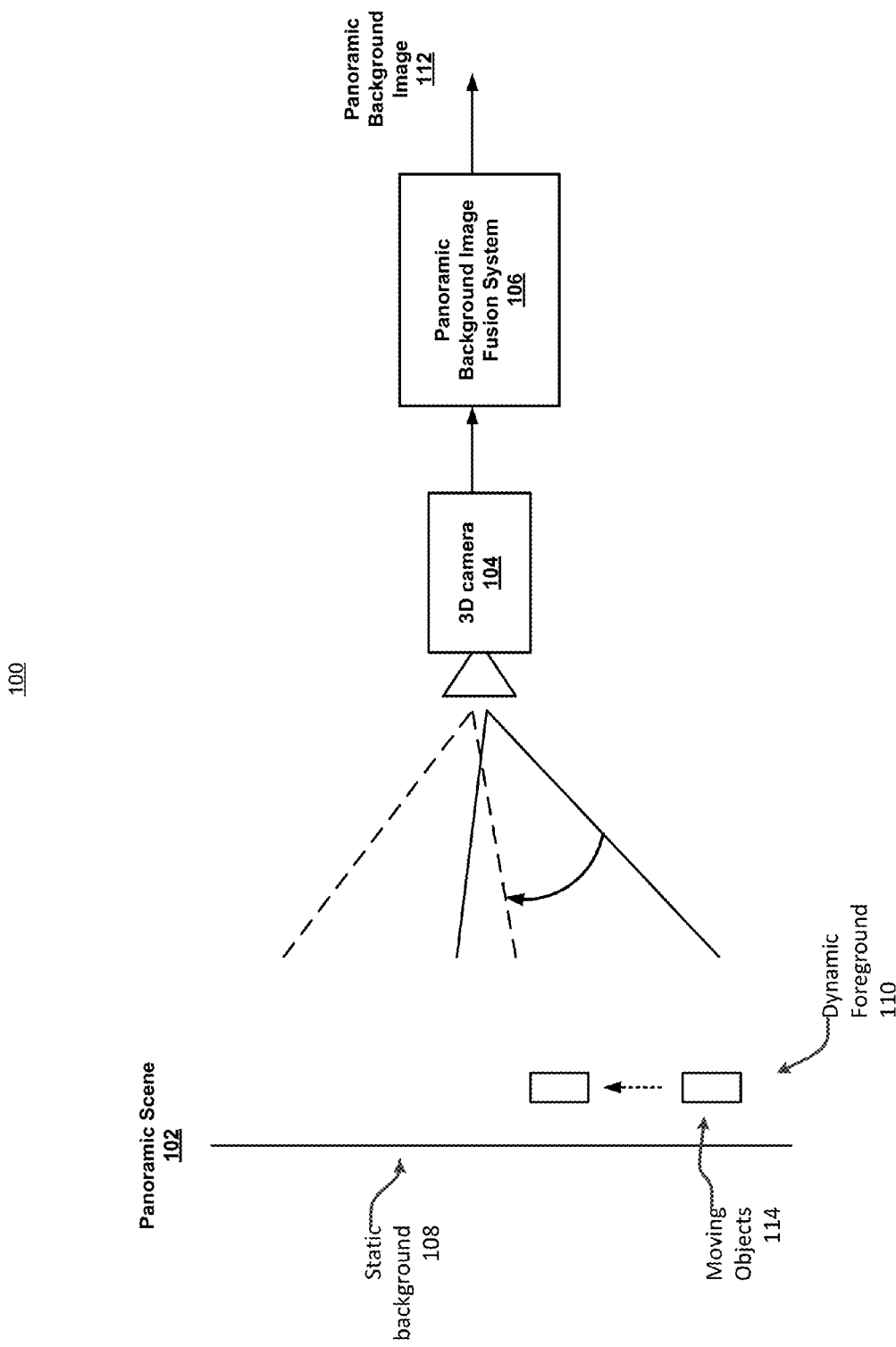
FIG. 1 illustrates an example deployment of a panoramic background image fusion system, configured in accordance with certain of the embodiments disclosed herein.

FIG. 1 illustrates an example deployment of a panoramic background image fusion system, configured in accordance with certain of the embodiments disclosed herein. A panoramic scene 102 may include a relatively static background 108 and a relatively more dynamic foreground 110 with moving objects 114 as shown. A 3D camera 104 may be configured to capture a series of 3D images of the scene 102, for example by rotating or panning from left to right (or in any suitable direction) as illustrated. The first captured image may be considered a reference image frame from which a reference co-ordinate system will be established, as explained below. Although the first image is considered the reference image for simplicity, in general, any one of the captured images may serve as a reference image to which all other images may be transformed. The 3D camera images are generally composed of pixels providing both color information (e.g., red, green, blue or RGB data) and depth information, although other color schemes and formats are possible, including black and white, or gray scale. The color data may also convey textural information about the image while the depth information may indicate the distance from the camera to the point in the scene associated with the given pixel.

The viewing angle of the camera may be insufficiently wide to capture the entire scene 102, thus requiring that the individual images be integrated or stitched together to form a complete panoramic background image 112. This process is accomplished by panoramic background image fusion system 106 as will be described herein.

Figure 2:
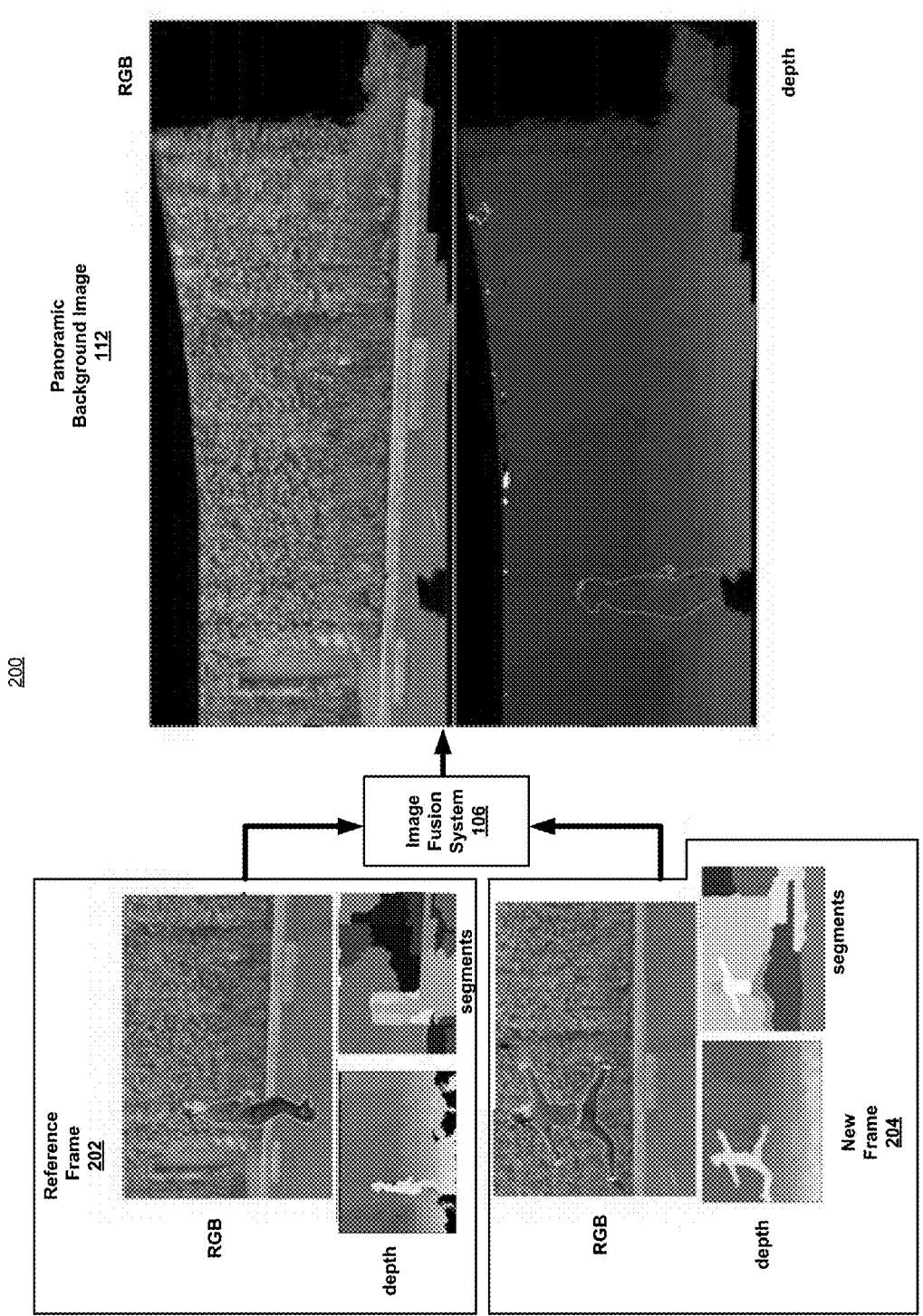
FIG. 2 illustrates image frames associated with a panoramic background image fusion system, configured in accordance with certain of the embodiments disclosed herein.

FIG. 2 illustrates examples of image frames associated with a panoramic background image fusion system, configured in accordance with certain of the embodiments disclosed herein. A reference frame 202, along with a subsequent or "new" frame 204, is shown to include RGB data, depth data and example frame segmentation. The images show a person in the foreground against a background scene of curbs and vegetation. The depth data indicates that the person is relatively closer to the camera, with the lighter shading, while the background is relatively further from the camera, with the darker shading. As can be seen, the person in the image is moving between frames 202 and 204. The images are partitioned into segments, as will be described later, including for example, the person's shirt, pants and head, as well as other regions of the image. The image fusion system generates a cleaned panoramic background image 112 that includes both RGB and depth data. In this generated output image 112, the moving person has been removed and replaced with background scenery and the new frame has been transformed and stitched onto the reference frame.

Figure 3:
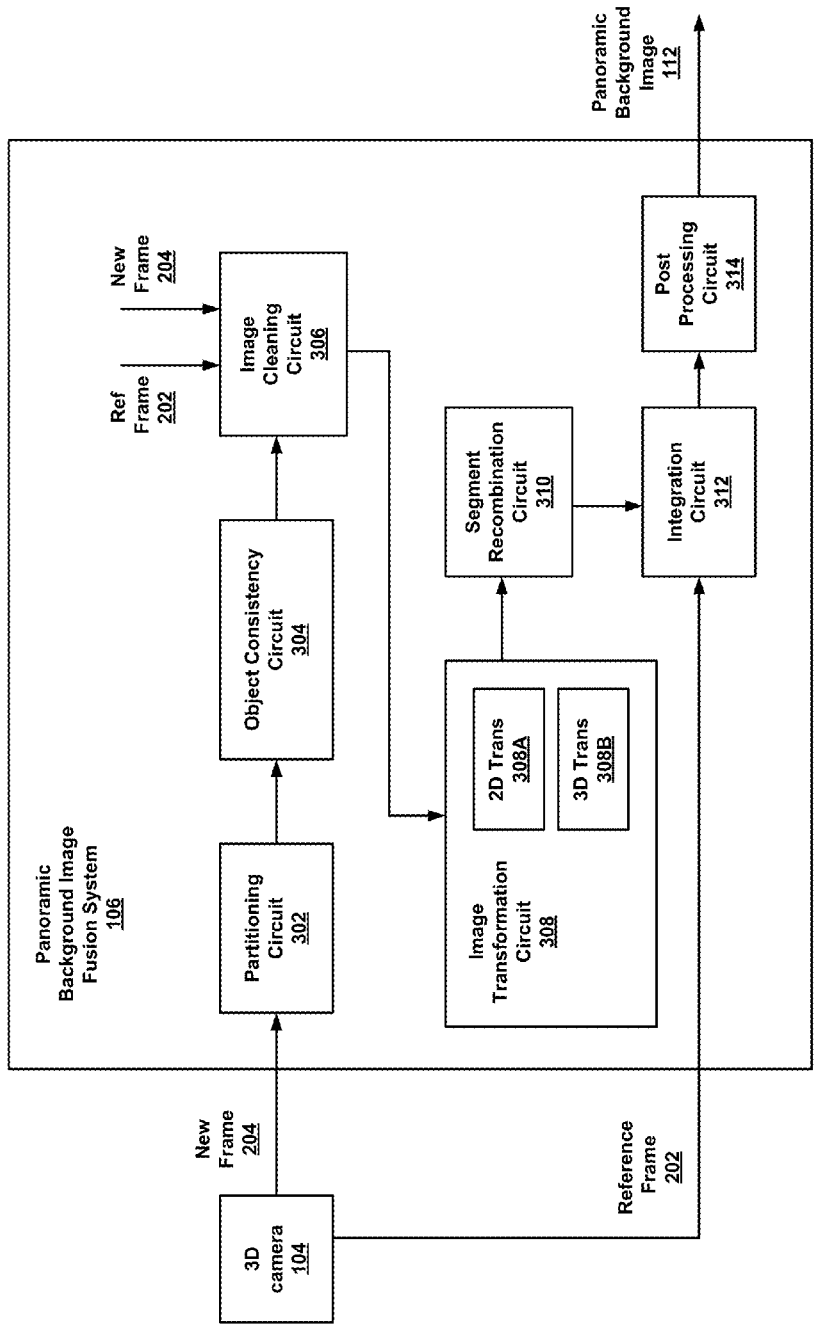
FIG. 3 is a top level system diagram of a panoramic background image fusion system, configured in accordance with certain of the embodiments disclosed herein.

FIG. 3 is a top level system diagram of a panoramic background image fusion system, configured in accordance with certain of the embodiments disclosed herein. The system is shown to include a partitioning circuit 302, an object consistency circuit 304, an image cleaning circuit 306, an image transformation circuit 308, a segment recombination circuit 310, an integration circuit 312 and a post processing circuit 314. The 3D camera 104 provides a reference frame 202 and one or more new frames 204.

The partitioning circuit 302 may be configured to partition the new image frame received from the camera 104 into segments and objects. Segments may be composed of groupings of pixels that share one or more common features associated with color data and depth data. For example a region of the image with a color and/or depth that differs from surrounding regions may be defined as a segment. This may be accomplished using any of a number of known techniques including, for example, Markov Random Field energy optimization. The objects may be composed of one or more related segments that when combined together form a recognizable object or structure. For example, with reference to FIG. 2, the person as a whole may be recognized as an object composed of individual segments such as the head, hat, shirt and pants. Objects may be identified using any of a number of known pattern recognition techniques.

The object consistency circuit 304 may be configured to maintain the structure of the objects and segments of a scene during transformation of image frames back to reference frame co-ordinates, in order to reduce distortion effects and/or fragmentation of the objects. In other words, an entire segment or object is transformed as a complete unit, using an adaptively selected 2D or 3D transformation, to maintain the structure of that segment/object and produce a more visually appealing/realistic result. This avoids situations where different parts of an object may be transformed differently causing fragmentation of the object. The object consistency circuit 304 will be described in greater detail in connection with FIG. 4.

The image cleaning circuit 306 may be configured to identify a moving object based on a comparison of the location of the object in one image frame relative to the location of the object in another image frame, such as, for example, the reference image frame. The moving object is then removed from any or all frames in which it appears. The removal may be accomplished by substitution of color data and depth data obtained from image frames where the background behind the moving object is exposed. The image cleaning circuit 306 will be described in greater detail in connection with FIGS. 5 and 6.

The image transformation circuit 308 may be configured to perform 2D and/or 3D transformations of segments, objects and other remaining background regions of the new frames from the co-ordinate system of the new frame to the co-ordinate system of the reference frame. The image transformation circuit 308 will be described in greater detail in connection with FIGS. 7 and 8.

The segment recombination circuit 310 may be configured to combine the transformed segments, objects and remaining background regions into a transformed image frame. The recombination may also include the elimination of conflicting duplicates of transformed objects and segments. For example, if a segment were transformed by both the 2D transformation and the 3D transformation, one of these duplicative transformed segments would be eliminated during recombination. In some embodiments, the conflict may be resolved in favor of the 2D transformation since an object that was assigned to both 2D and 3D processing probably has unreliable depth information and would therefore be unsuitable for 3D processing. The integration circuit 312 may be configured to integrate or stitch together the transformed image frames to the reference frame. The post processing circuit 314 may be configured to perform additional visual processing on the integrated image to generate the cleaned panoramic background image 112. The post processing circuit 314 will be described in greater detail in connection with FIG. 9.

Figure 4:
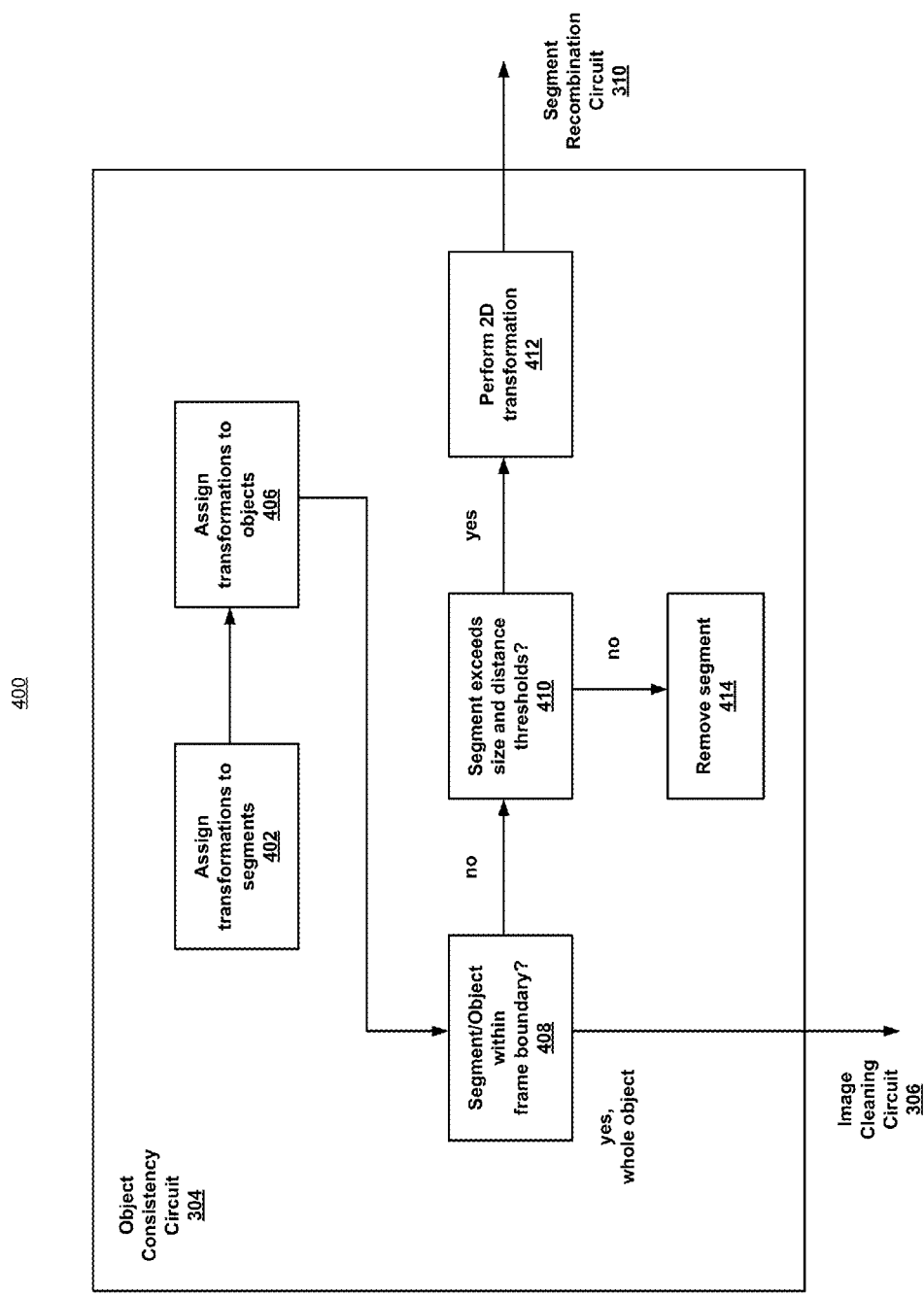
FIG. 4 is a more detailed block diagram of an object consistency component of the panoramic background image fusion system, configured in accordance with certain of the embodiments disclosed herein.

FIG. 4 is a more detailed block diagram of the object consistency circuit 304, in accordance with certain of the embodiments disclosed herein. The object consistency circuit 304 is shown to include a number of sub-circuits or operational components. The object consistency circuit 304 is configured to assign a transformation type (e.g., either 2D or 3D) to the segments of the image frame, at operation 402 and to the objects of the image frame at operation 406. Segment transformation assignments may be based on the distance of the segment from the camera, where, for example, a 3D transformation is used for relatively closer segments and a 2D transformation is used for relatively farther away segments. Segment assignments may also be based on indications of depth errors (or confidence values) associated with pixels in the segment. Object transformation assignments may be based on a percentage of assigned transformation types to each of the segments in the object. For example, if more than 50 percent of the segments in the object have been assigned to a 2D transformation, then the object as a whole may be assigned to a 2D transformation. Of course thresholds other than 50 percent may be used, or indeed any other suitable statistical measure of the assignment of transformations of segments may be used for this purpose.

A determination is made, at operation 408, as to whether the segment or object is contained entirely within the image frame. In some embodiments this determination may be based on whether or not the boundary of the segment or object is in contact with the boundary of the frame, although other suitable criteria may be used. If the segment or object is within the frame then it is considered to be a "whole" object and is passed on to the image cleaning circuit 306. Otherwise, at operation 410, if the segment has been assigned to 2D transformation, and if the segment size and distance from the camera exceed threshold values, then a 2D transformation is performed on the segment at operation 412 and the transformed segment is passed directly on to the segment recombination circuit 310. In some embodiments, the size threshold may be in the range of 10 to 15 percent of the area of the image frame, and the distance threshold may be in the range of 10 to 12 meters from the camera. Otherwise, at operation 414, the segment is removed, at least temporarily, in the manner described below in connection with the image cleaning circuit 306. That segment may be restored later during processing of a subsequent "new" image frame in which the segment may be entirely contained in the frame.

Figure 5:
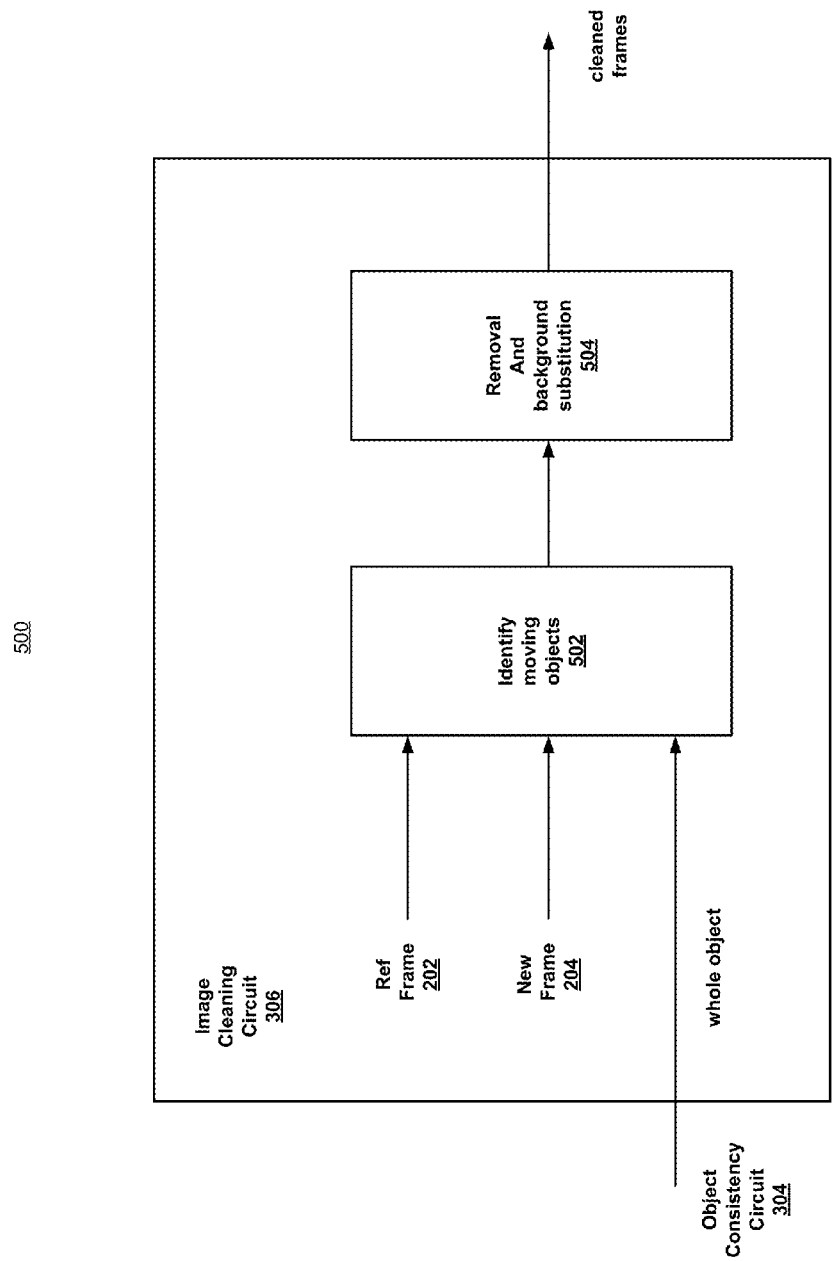
FIG. 5 is another detailed block diagram of an image cleaning component of the panoramic background image fusion system, configured in accordance with certain of the embodiments disclosed herein.
Figure 6:
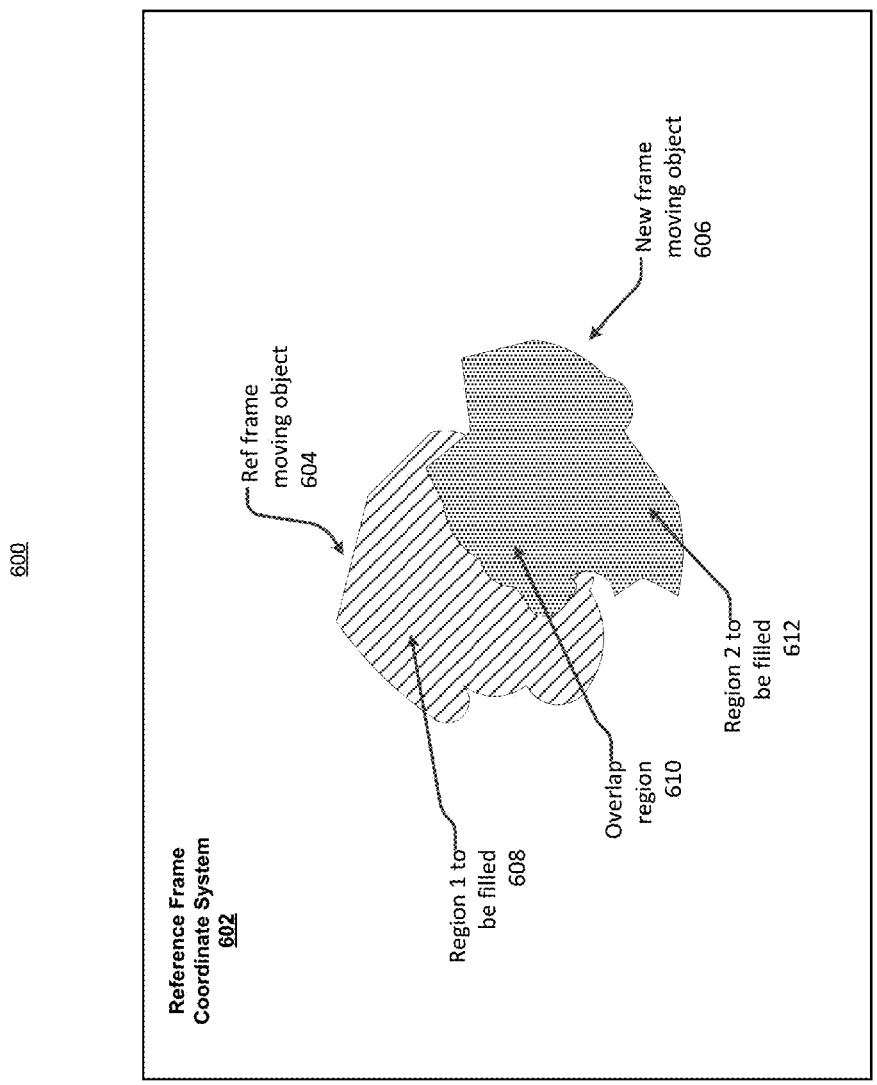
FIG. 6 illustrates removal of a moving object from an image, in accordance with certain of the embodiments disclosed herein.

FIG. 5 illustrates a more detailed block diagram of the image cleaning circuit 306, configured in accordance with certain of the embodiments disclosed herein. The image cleaning circuit 306 is shown to include a number of sub-circuits or operational components. The image cleaning circuit 306 is configured to identify and remove moving objects and replace them with appropriate background scenery. At operation 502, the location of entire or "whole" objects, as provided by the object consistency circuit, are compared between the reference frame 202 and the new frame 204. The relative locations of the objects within the frames will change if the object is in motion. Objects identified as moving are then removed, at operation 504, from the reference and new frames 202, 204 by substitution of background image scenery that is located behind the moving object. This background image scenery is composed of pixels that may be obtained from other frames in which the moving object is not obscuring that particular region of the background scene. This process is illustrated in more detail in FIG. 6 for the case where there is a reference frame 202 and, for simplicity, just one new frame 204. An identified moving object 604 from the reference frame 202 is shown. That same moving object, identified in the new frame 204, is shown as object 606 when projected into the reference frame co-ordinate system 602. Region 1 608 may be filled with background pixels from the new frame and region 2 612 may be filled with background pixels from the reference frame. In this example, visible background pixels are not available from either the reference or new frames, however, for the region of overlap 610. Additional frames may be required to provide background pixels to fill in this overlap region, or other methods may be employed to estimate the background.

Figure 7:
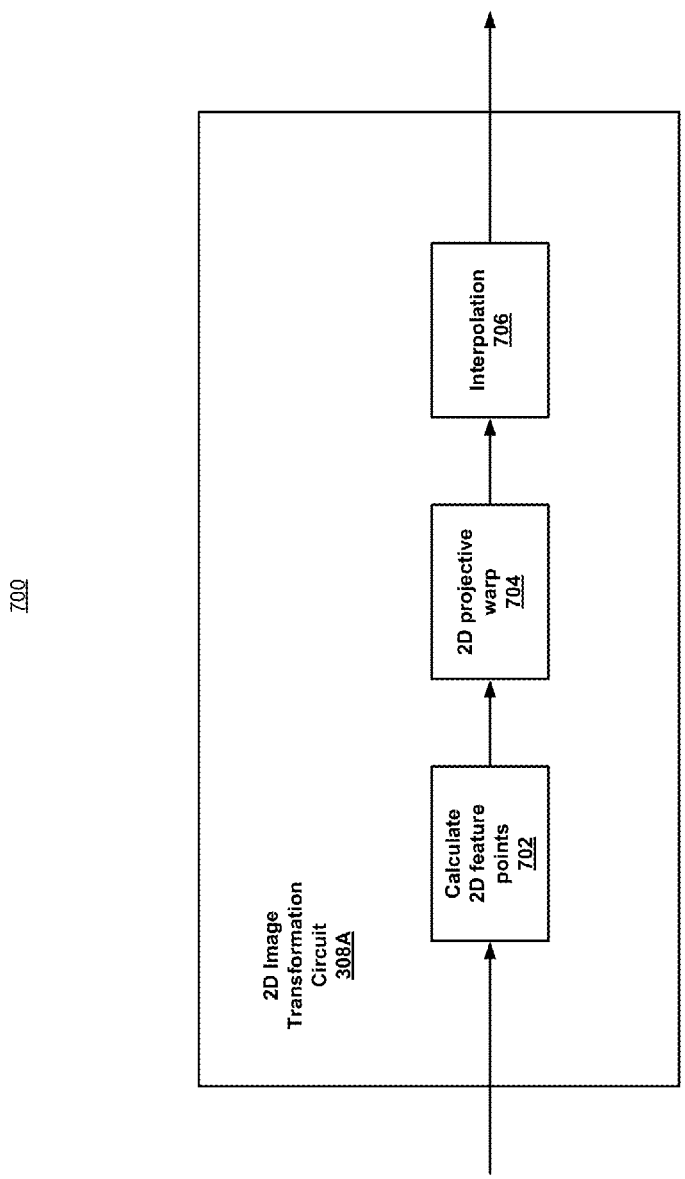
FIG. 7 is another detailed block diagram of a 2D image transformation component of the panoramic background image fusion system, configured in accordance with certain of the embodiments disclosed herein.

FIG. 7 illustrates a more detailed block diagram of the 2D image transformation circuit 308A, configured in accordance with certain of the embodiments disclosed herein. The 2D image transformation circuit 308A is shown to include a number of sub-circuits or operational components. The 2D image transformation circuit 308A is configured to perform a 2D transformation of objects, segment or other groups of pixels (i.e., a region of the image) from a co-ordinate system of the image frame in which they were received to the co-ordinate system of the reference image frame. 2D image transformation is most suitable for scenes that are sufficiently far from the camera to avoid parallax effects, of for scenes that have a single depth. In some embodiments, 2D feature points within the region are calculated, at operation 702, using known methods or techniques. A 2D projective warping (e.g., rotation and translation) is then performed, at operation 704, based on the feature points, also using known methods or techniques. At operation 706, pixel interpolation may be performed on the warped image region to fill in pixel gaps that may have been created by the warping process which does not always result in a one-to-one mapping of pixels pre- and post-transformation.

Figure 8:
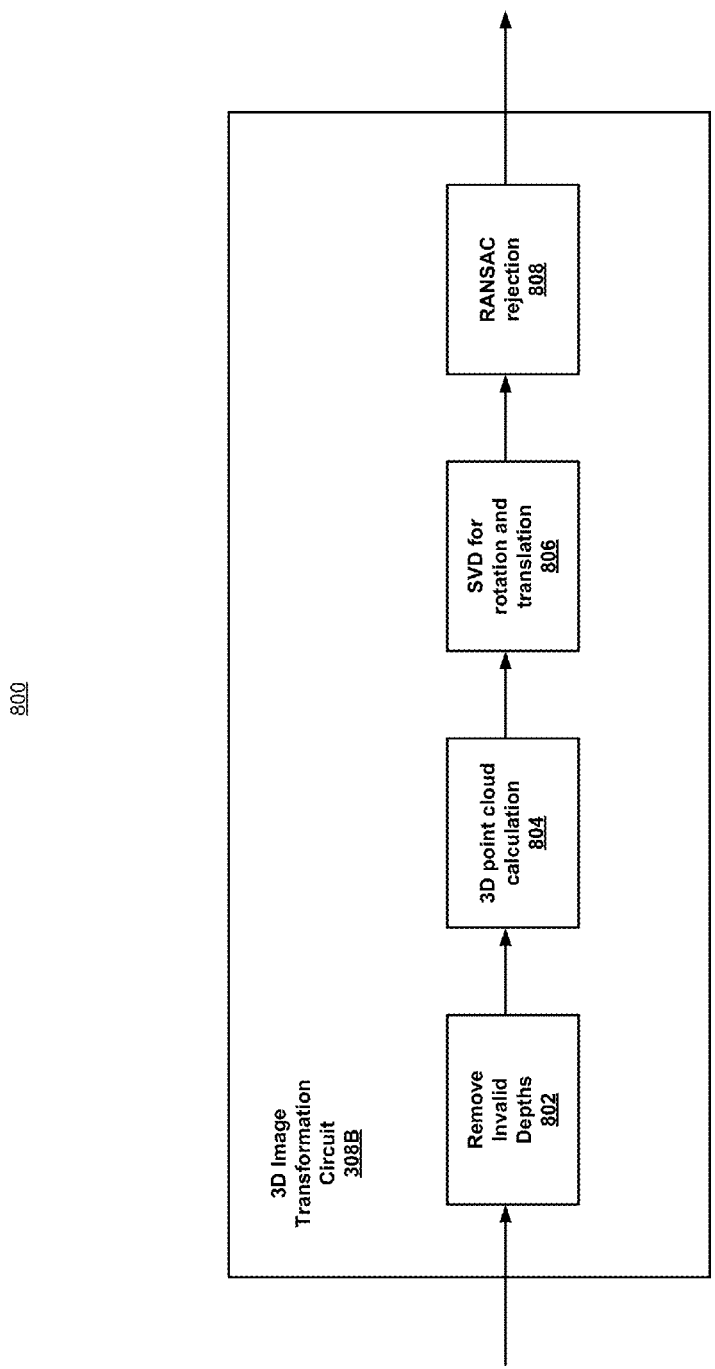
FIG. 8 is another detailed block diagram of a 3D image transformation component of the panoramic background image fusion system, configured in accordance with certain of the embodiments disclosed herein.

FIG. 8 illustrates a more detailed block diagram of the 3D image transformation circuit 308B, configured in accordance with certain of the embodiments disclosed herein. The 3D image transformation circuit 308B is shown to include a number of sub-circuits or operational components. The 3D image transformation circuit 308B is configured to perform a 3D transformation of objects, segment or other groups of pixels (i.e., a region of the image) from a co-ordinate system of the image frame in which they were received to the co-ordinate system of the reference image frame. 3D image transformation is most suitable for scenes that include multiple depths and are typically relatively close to the camera, although in practice 3D image transformation sometimes suffer when the available depth information is spatially or temporally incorrect. In some embodiments, pixels having invalid depth values are first removed, at operation 802. Such pixels may be identified by comparing confidence values, provided by the camera system (or other circuitry), associated with each pixel, to a confidence threshold value that indicates acceptance of the depth value. At operation 804, a 3D point cloud is calculated for the image region using known methods or techniques. At operation 806, the image region is rotated and translated, based on the 3D point cloud, using known methods and techniques, such as, for example singular value decomposition (SVD). At operation 808, a known random sample consensus (RANSAC) technique may be applied to improve the 3D transformation through an iterative estimation process that attempts to reduce the effect of outlier pixel data.

In some embodiments, prior to segment recombination by circuit 310, relatively large segments (again, 10 to 15 percent of the scene) that are near the frame boundary but are close enough to be within the depth limit of the camera, and which have survived earlier elimination operations (e.g., moving object removal, bad depth data removal, etc.), may be detected. These segments may undergo the 2D image transformation and then be included in the segment recombination operation.

Figure 9:
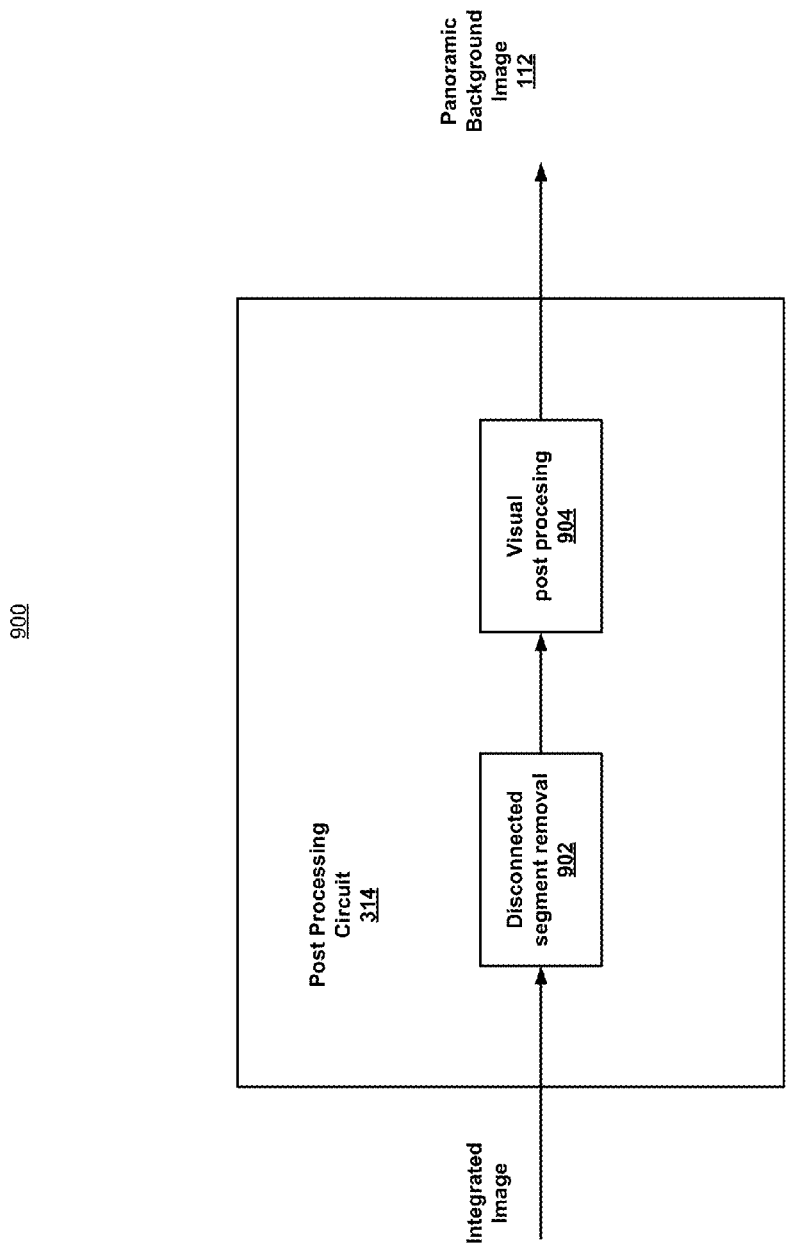
FIG. 9 is another detailed block diagram of a post processing component of the panoramic background image fusion system, configured in accordance with certain of the embodiments disclosed herein.

FIG. 9 illustrates a more detailed block diagram of the post processing circuit 314, configured in accordance with certain of the embodiments disclosed herein. The post processing circuit 314 is shown to include a number of sub-circuits or operational components. The post processing circuit 314 is configured to perform additional visual processing on the integrated image to generate the cleaned panoramic background image 112. At operation 902, disconnected segments, that is to say segments which are relatively small and distant from other segments, may be removed from the integrated image. These disconnected segments may be visually unpleasant artifacts and their removal may improve the final panoramic image. At operation 904, a final visual post processing step may be performed that can include an additional interpolation on the integrated image to fill in any remaining pixel gaps, for example gaps resulting from quantization during the transformation processes. Visual post processing 904 may also include color normalization and/or illumination correction using known methods and techniques.

The resulting cleaned panoramic background image 112 may be used for a variety of imaging applications including, for example, special visual effects, virtual reality, video editing and video compositing.

Methodology

FIG. 10 is a flowchart illustrating an example method 1000 for generating a panoramic background image, in accordance with an embodiment of the present disclosure. As can be seen, example method 1000 includes a number of phases and sub-processes, the sequence of which may vary form one embodiment to another. However, when considered in the aggregate, these phases and sub-processes form a panoramic background image generation process in accordance with certain of the embodiments disclosed herein. These embodiments can be implemented, for example using the system architecture illustrated in FIG. 3, as described above. However other system architectures can be used in other embodiments, as will be apparent in light of this disclosure. To this end, the correlation of the various functions shown in FIG. 10 to the specific components illustrated in FIG. 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 1000. Thus other embodiments may have fewer or more modules and/or sub-modules depending on the granularity of implementation. Numerous variations and alternative configurations will be apparent in light of this disclosure.

As illustrated in FIG. 10, in one embodiment panoramic background image generation method 1000 commences by receiving, at operation 1010, a reference image frame and a second image frame, from a camera. The second image frame may be offset from the reference image frame, typically with some region of overlap. The reference image frame and the second image frame comprise pixels that provide color data (RGB) and depth data (D).

Next, at operation 1020, the second image frame is partitioned into segments and objects. Each segment comprises a grouping of the pixels which share one or more common features. These features may be associated with characteristics of the color data and/or the depth data. The segmentation may be performed using any of a number of known techniques including, for example, Markov Random Field energy optimization. The objects may comprise one or more related segments, for example, based on selected parameters of interest and determined by any suitable known techniques.

At operation 1030, a transformation type (either a 2D transformation or a 3D transformation) is then assigned to each of the segments. The assignment is generally based on the distance of the segment from the camera, although additional information such as depth data confidence values or error indications may also be used.

At operation 1040, a transformation type is then assigned to each object based on a percentage of assigned transformation types to each of the segments in the object. For example, if more than half of the segments in the object were assigned to the 2D transformation type, the object as a whole may be assigned to the 2D transformation type.

A transformation is then performed on the objects, at operation 1050, using the transformation type assigned to that object, that is to say either a 2D or 3D transformation. The transformation remaps the objects from the co-ordinate system of the second image frame to the co-ordinate system of the reference image frame. Then, at operation 1060, the remaining segments that were not included in the objects (for example segments associated with the background of the image scene) are transformed, using the transformation type assigned to those segments, to transform those segments to the co-ordinate system of the reference image frame.

At operation 1070, the second image frame, comprising the transformed objects and the transformed segments, is integrated with the reference image frame to generate the panoramic background image.

Of course, in some embodiments, additional operations may be performed, as previously described in connection with the system. These additional operations may include, for example, identifying and removing moving objects from the image frames and replacing those regions with background scenery obtained from other image frames.

Example System

Figure 11:
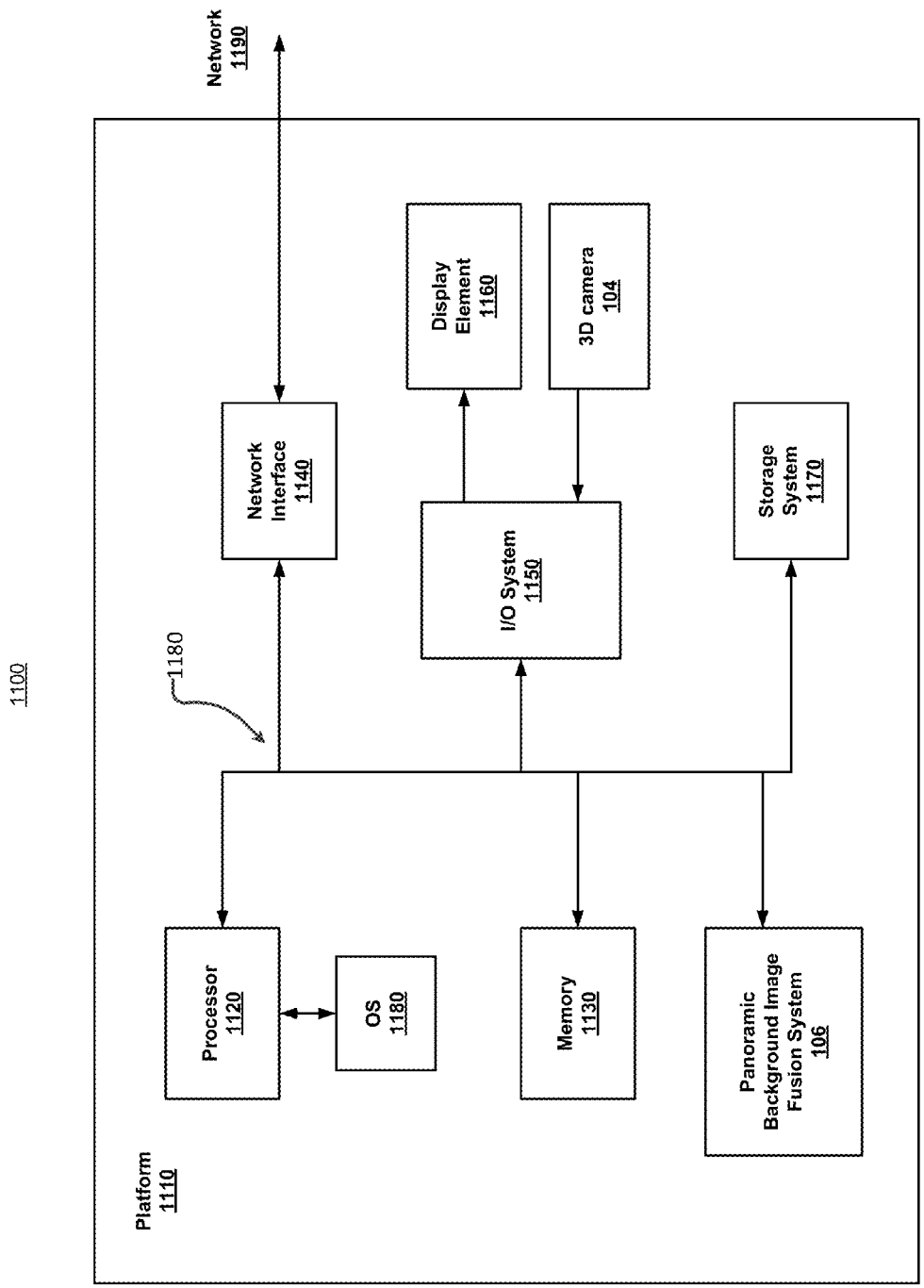
FIG. 11 is a block diagram schematically illustrating a system platform to carry out panoramic background image fusion, configured in accordance with certain of the embodiments disclosed herein.

FIG. 11 illustrates an example system 1100 that may carry out panoramic background image fusion, as described herein. In some embodiments, system 1100 comprises a platform 1110 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. Any combination of different devices may be used in certain embodiments.

In some embodiments, platform 1110 may comprise any combination of a processor 1120, a memory 1130, a panoramic background image fusion system 106, a network interface 1140, an input/output (I/O) system 1150, a display element 1160, a camera 104 and a storage system 1170. As can be further seen, a bus and/or interconnect 1180 is also provided to allow for communication between the various components listed above and/or other components not shown. Platform 1110 can be coupled to a network 1190 through network interface 1140 to allow for communications with other computing devices, platforms or resources, not shown. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor or a graphics processing unit, to assist in control and processing operations associated with system 1100. In some embodiments, the processor 1120 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1100, and therefore may also be implemented using any suitable existing or subsequently-developed platform.

Network interface module 1140 can be any appropriate network chip or chipset which allows for wired and/or wireless connection between other components of computer system 1100 and/or network 1190, thereby enabling system 1100 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of computer system 1100. I/O devices may include, but not be limited to, a display element 1160, a camera 104, and other devices not shown such as a keyboard, mouse, speakers, and/or microphone, etc. Camera 104 may include both 2D and 3D imaging capabilities, as described previously.

I/O system 1150 may include a graphics subsystem configured to perform processing of images for display element 1160. Graphics subsystem may be a graphics processing unit or a visual processing unit (VPU), for example. An analog or digital interface may be used to communicatively couple graphics subsystem and display element 1160. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1120 or any chipset of platform 1110. In some embodiments, display element 1160 may comprise any television type monitor or display. Display element 1160 may comprise, for example, a computer display screen, touchscreen display, video monitor, television-like device, and/or a television. Display element 1160 may be digital and/or analog. In embodiments, display element 1160 may be a holographic display. Also, display element 1160 may be a transparent or opaque surface that may receive a visual projection. Such projections may convey various forms of information, images, and/or objects. For example, such projections may be a visual overlay for a mobile augmented reality (MAR) application. Under the control of the OS 1180 (or one or more software applications), platform 1110 may display a user interface on display element 1160.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Panoramic background image fusion system 106 is configured to receive and process a reference image frame and one or more additional image frames, as camera 104 scans a panoramic scene, and to generate a composite panoramic image that includes static background features after removal of dynamic (moving) foreground features, as described previously. Panoramic background image fusion system 106 may include any or all of the components illustrated in FIG. 3 and described above. Panoramic background image fusion system 106 can be implemented or otherwise used in conjunction with a variety of suitable software and/or hardware that is coupled to or that otherwise forms a part of system 1100. Panoramic background image fusion system 106 can additionally or alternatively be implemented or otherwise used in conjunction with user I/O devices that are capable of providing information to, and receiving information and commands from, a user. These I/O devices may include display element 1160, camera 104, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments panoramic background image fusion system 106 may be installed local to system 1100, as shown in the example embodiment of FIG. 11. Alternatively, system 1100 can be implemented in a client-server arrangement wherein at least some functionality associated with panoramic background image fusion system 106 is provided to system 1100 using an applet, such as a JavaScript applet, or other downloadable module. Such a remotely accessible module or sub-module can be provisioned in real-time in response to a request from a client computing system for access to a given server having resources that are of interest to the user of the client computing system. For example, a user of a tablet computer may invoke functionality associated with panoramic background image fusion system 106 upon accessing a networked media store containing images which are to be processed. In such embodiments the server can be local to network 1190 or remotely coupled to network 1190 by one or more other networks and/or communication channels. In some cases access to resources on a given network or computing system may require credentials such as usernames, passwords, and/or compliance with any other suitable security mechanism. In any such stand-alone or networked computing scenarios, panoramic background image fusion system 106 may be implemented with any suitable technologies that allow a user to generate fused panoramic background images.

In various embodiments, system 1100 may be implemented as a wireless system, a wired system, or a combination of both. When implemented as a wireless system, system 1100 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the object tracking methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments panoramic background image fusion system 106 provides background image fusion by leveraging processing resources provided by a remote computer system accessible via network 1190. In other embodiments the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1100 may comprise additional, fewer, or alternative sub-components as compared to those included in the example embodiment of FIG. 11.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for generating a panoramic background image. The method comprises receiving, by a processor, a reference image frame and a second image frame, from a camera, the second image frame offset from the reference image frame, wherein the reference image frame and the second image frame comprise pixels providing color data and depth data. The method further comprises partitioning, by the processor, the second image frame into segments and objects, the segments comprising a group of pixels sharing one or more common features associated with the color data and depth data, the objects comprising one or more related segments. The method further comprises assigning, by the processor, a transformation type to each of the segments, based on a distance of the segment from the camera, wherein the transformation type is selected from the group consisting of a two dimensional (2D) transformation and a three dimensional (3D) transformation. The method further comprises assigning, by the processor, one of the transformation types to each of the objects, based on a percentage of assigned transformation types to each of the segments in the object. The method further comprises performing, by the processor, a transformation of the objects and a subset of the segments not included in the objects, to a co-ordinate system of the reference image frame using the assigned transformation types. The method further comprises integrating, by the processor, the second image frame, comprising the transformed objects and the transformed segments, with the reference image frame to generate the panoramic background image.

Example 2 includes the subject matter of Example 1, further comprising: identifying a moving object based on a comparison of the location of the object in the second image frame relative to the reference image frame; and cleaning of the reference image frame and the second image frame, by removal of the identified moving object and substitution of color data and depth data associated with background regions of the reference image frame and the second image frame, wherein the cleaning is performed prior to performing the transformation of the objects.

Example 3 includes the subject matter of Examples 1 and 2, further comprising determining if the segments are fully contained within a boundary of the second image frame prior to performing the transformation of the segments.

Example 4 includes the subject matter of any of Examples 1-3, further comprising, if the segments are not fully contained within the boundary: determining if a size of the segment exceeds a size threshold and a distance of the segment from the camera exceeds a distance threshold; and if the determination is true, performing a 2D transformation on the segment; otherwise removing the segment and substituting color data and depth data associated with background regions of the reference image frame and the second image frame.

Example 5 includes the subject matter of any of Examples 1-4, wherein the size threshold is in the range of 1 to 20 percent of the area of the second image frame, and the distance threshold is 10 meters or more from the camera.

Example 6 includes the subject matter of any of Examples 1-5, wherein the assigning of a transformation type to each of the segments is further based on depth error information associated with the pixels of the segment.

Example 7 includes the subject matter of any of Examples 1-6, wherein the 2D transformation comprises projective warping and interpolation, and wherein the 3D transformation comprises rotation and translation.

Example 8 includes the subject matter of any of Examples 1-7, further comprising resolving conflicts in the assignment of transformation of segments to both the 2D transformation type and the 3D transformation type, the resolution in favor of the 2D transformation type.

Example 9 is a system for generating a panoramic background image. The system comprises a partitioning circuit to partition an image frame received from a camera into segments and objects, the segments comprising a group of pixels sharing one or more common features associated with color data and depth data, the objects comprising one or more related segments. The system further comprises an object consistency circuit to assign a transformation type to each of the segments, based on a distance of the segment from the camera, wherein the transformation type is selected from the group consisting of a two dimensional (2D) transformation and a three dimensional (3D) transformation, the object consistency circuit further to assign one of the transformation types to each of the objects, based on a percentage of assigned transformation types to each of the segments in the object. The system further comprises an image transformation circuit to transform the objects and a subset of the segments not included in the objects, to a co-ordinate system of a reference image frame received from the camera, using the assigned transformation types. The system further comprises a segment recombination circuit to eliminate duplicates of the transformed objects and segments and to combine the transformed objects and segments into a transformed image frame. The system further comprises an integration circuit to integrate the transformed image frame with the reference image frame to generate the panoramic background image.

Example 10 includes the subject matter of Example 9, wherein the image transformation circuit comprises a 2D transformation circuit to perform projective warping and interpolation, and a 3D transformation circuit to perform rotation and translation.

Example 11 includes the subject matter of Examples 9 and 10, further comprising an image cleaning circuit to identify a moving object based on a comparison of the location of the object in the image frame relative to the reference image frame; and clean the image frame and the reference image frame, by removal of the identified moving object and substitution of color data and depth data associated with background regions of the image frame and the reference image frame, wherein the cleaning is performed prior to performing the transformation of the objects.

Example 12 includes the subject matter of any of Examples 9-11, wherein the object consistency circuit is further to determine if the segments are fully contained within a boundary of the image frame prior to performing the transformation of the segments.

Example 13 includes the subject matter of any of Examples 9-12, wherein the object consistency circuit is further to, if the segments are not fully contained within the boundary: determine if a size of the segment exceeds a size threshold and a distance of the segment from the camera exceeds a distance threshold; and if the determination is true, perform a 2D transformation on the segment; otherwise remove the segment and substitute color data and depth data associated with background regions of the image frame and the reference image frame.

Example 14 includes the subject matter of any of Examples 9-13, wherein the size threshold is in the range of 1 to 20 percent of the area of the image frame, and the distance threshold is 10 meters or more from the camera.

Example 15 includes the subject matter of any of Examples 9-14, wherein the assignment of a transformation type to each of the segments is further based on depth error information associated with the pixels of the segment.

Example 16 includes the subject matter of any of Examples 9-15, wherein the segment recombination circuit is further to eliminate duplicates of the transformed objects and segments by resolving conflicts in the assignment of transformation of segments to both the 2D transformation type and the 3D transformation type, in favor of the 2D transformation type.

Example 17 is a non-transitory computer readable storage medium having instructions encoded thereon that, when executed by one or more processors, result in the following operations for generating a panoramic background image. The operations comprise receiving, by a processor, a reference image frame and a second image frame, from a camera, the second image frame offset from the reference image frame, wherein the reference image frame and the second image frame comprise pixels providing color data and depth data. The operations further comprise partitioning, by the processor, the second image frame into segments and objects, the segments comprising a group of pixels sharing one or more common features associated with the color data and depth data, the objects comprising one or more related segments. The operations further comprise assigning, by the processor, a transformation type to each of the segments, based on a distance of the segment from the camera, wherein the transformation type is selected from the group consisting of a two dimensional (2D) transformation and a three dimensional (3D) transformation. The operations further comprise assigning, by the processor, one of the transformation types to each of the objects, based on a percentage of assigned transformation types to each of the segments in the object. The operations further comprise performing, by the processor, a transformation of the objects and a subset of the segments not included in the objects, to a co-ordinate system of the reference image frame using the assigned transformation types. The operations further comprise integrating, by the processor, the second image frame, comprising the transformed objects and the transformed segments, with the reference image frame to generate the panoramic background image.

Example 18 includes the subject matter of Example 17, further comprising: identifying a moving object based on a comparison of the location of the object in the second image frame relative to the reference image frame; and cleaning of the reference image frame and the second image frame, by removal of the identified moving object and substitution of color data and depth data associated with background regions of the reference image frame and the second image frame, wherein the cleaning is performed prior to performing the transformation of the objects.

Example 19 includes the subject matter of Examples 17 and 18, further comprising determining if the segments are fully contained within a boundary of the second image frame prior to performing the transformation of the segments.

Example 20 includes the subject matter of any of Examples 17-19, further comprising, if the segments are not fully contained within the boundary: determining if a size of the segment exceeds a size threshold and a distance of the segment from the camera exceeds a distance threshold; and if the determination is true, performing a 2D transformation on the segment; otherwise removing the segment and substituting color data and depth data associated with background regions of the reference image frame and the second image frame.

Example 21 includes the subject matter of any of Examples 17-20, wherein the size threshold is in the range of 1 to 20 percent of the area of the second image frame, and the distance threshold is 10 meters or more from the camera.

Example 22 includes the subject matter of any of Examples 17-21, wherein the assigning of a transformation type to each of the segments is further based on depth error information associated with the pixels of the segment.

Example 23 includes the subject matter of any of Examples 17-22, wherein the 2D transformation comprises projective warping and interpolation, and wherein the 3D transformation comprises rotation and translation.

Example 24 includes the subject matter of any of Examples 17-23, further comprising resolving conflicts in the assignment of transformation of segments to both the 2D transformation type and the 3D transformation type, the resolution in favor of the 2D transformation type.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for generating a panoramic background image, said method comprising:
   receiving, by a processor, a reference image frame and a second image frame, from a camera, said second image frame offset from said reference image frame, wherein said reference image frame and said second image frame comprise pixels providing color data and depth data;
   partitioning, by said processor, said second image frame into segments and objects, said segments comprising a group of pixels sharing one or more common features associated with said color data and depth data, said objects comprising one or more related segments;
   assigning, by said processor, a transformation type to each of said segments, based on a distance of said segment from said camera, wherein said transformation type is selected from the group consisting of a two dimensional (2D) transformation and a three dimensional (3D) transformation;
   assigning, by said processor, one of said transformation types to each of said objects, based on a percentage of assigned transformation types to each of said segments in said object;
   performing, by said processor, a transformation of said objects and a subset of said segments not included in said objects, to a co-ordinate system of said reference image frame using said assigned transformation types; and
   integrating, by said processor, said second image frame, comprising said transformed objects and said transformed segments, with said reference image frame to generate said panoramic background image.

2. The method of claim 1, further comprising:
   identifying a moving object based on a comparison of the location of said object in said second image frame relative to said reference image frame; and
   cleaning of said reference image frame and said second image frame, by removal of said identified moving object and substitution of color data and depth data associated with background regions of said reference image frame and said second image frame, wherein said cleaning is performed prior to performing said transformation of said objects.

3. The method of claim 1, further comprising determining if said segments are fully contained within a boundary of said second image frame prior to performing said transformation of said segments.

4. The method of claim 3, further comprising, if said segments are not fully contained within said boundary:
   determining if a size of said segment exceeds a size threshold and a distance of said segment from said camera exceeds a distance threshold; and
   if said determination is true, performing a 2D transformation on said segment;
   otherwise removing said segment and substituting color data and depth data associated with background regions of said reference image frame and said second image frame.

5. The method of claim 4, wherein said size threshold is in the range of 1 to 20 percent of the area of said second image frame, and said distance threshold is 10 meters or more from said camera.

6. The method of claim 1, wherein said assigning of a transformation type to each of said segments is further based on depth error information associated with said pixels of said segment.

7. The method of claim 1, wherein said 2D transformation comprises projective warping and interpolation, and wherein said 3D transformation comprises rotation and translation.

8. The method of claim 1, further comprising resolving conflicts in said assignment of transformation of segments to both said 2D transformation type and said 3D transformation type, said resolution in favor of said 2D transformation type.

9. A system for generating a panoramic background image, said system comprising:
- a partitioning circuit to partition an image frame received from a camera into segments and objects, said segments comprising a group of pixels sharing one or more common features associated with color data and depth data, said objects comprising one or more related segments;
- an object consistency circuit to assign a transformation type to each of said segments, based on a distance of said segment from said camera, wherein said transformation type is selected from the group consisting of a two dimensional (2D) transformation and a three dimensional (3D) transformation, said object consistency circuit further to assign one of said transformation types to each of said objects, based on a percentage of assigned transformation types to each of said segments in said object;
- an image transformation circuit to transform said objects and a subset of said segments not included in said objects, to a co-ordinate system of a reference image frame received from said camera, using said assigned transformation types;
- a segment recombination circuit to eliminate duplicates of said transformed objects and segments and to combine said transformed objects and segments into a transformed image frame; and
- an integration circuit to integrate said transformed image frame with said reference image frame to generate said panoramic background image.

10. The system of claim 9, wherein said image transformation circuit comprises a 2D transformation circuit to perform projective warping and interpolation, and a 3D transformation circuit to perform rotation and translation.

11. The system of claim 9, further comprising an image cleaning circuit to:
- identify a moving object based on a comparison of the location of said object in said image frame relative to said reference image frame; and
- clean said image frame and said reference image frame, by removal of said identified moving object and substitution of color data and depth data associated with background regions of said image frame and said reference image frame, wherein said cleaning is performed prior to performing said transformation of said objects.

12. The system of claim 9, wherein said object consistency circuit is further to determine if said segments are fully contained within a boundary of said image frame prior to performing said transformation of said segments.

13. The system of claim 12, wherein said object consistency circuit is further to, if said segments are not fully contained within said boundary:
- determine if a size of said segment exceeds a size threshold and a distance of said segment from said camera exceeds a distance threshold; and
- if said determination is true, perform a 2D transformation on said segment;
- otherwise remove said segment and substitute color data and depth data associated with background regions of said image frame and said reference image frame.

14. The system of claim 13, wherein said size threshold is in the range of 1 to 20 percent of the area of said image frame, and said distance threshold is 10 meters or more from said camera.

15. The system of claim 9, wherein said assignment of a transformation type to each of said segments is further based on depth error information associated with said pixels of said segment.

16. The system of claim 9, wherein said segment recombination circuit is further to eliminate duplicates of said transformed objects and segments by resolving conflicts in said assignment of transformation of segments to both said 2D transformation type and said 3D transformation type, in favor of said 2D transformation type.

17. At least one non-transitory computer readable storage medium having instructions encoded thereon that, when executed by one or more processors, result in the following operations for generating a panoramic background image, said operations comprising:
- receiving, by a processor, a reference image frame and a second image frame, from a camera, said second image frame offset from said reference image frame, wherein said reference image frame and said second image frame comprise pixels providing color data and depth data;
- partitioning, by said processor, said second image frame into segments and objects, said segments comprising a group of pixels sharing one or more common features associated with said color data and depth data, said objects comprising one or more related segments;
- assigning, by said processor, a transformation type to each of said segments, based on a distance of said segment from said camera, wherein said transformation type is selected from the group consisting of a two dimensional (2D) transformation and a three dimensional (3D) transformation;
- assigning, by said processor, one of said transformation types to each of said objects, based on a percentage of assigned transformation types to each of said segments in said object;
- performing, by said processor, a transformation of said objects and a subset of said segments not included in said objects, to a co-ordinate system of said reference image frame using said assigned transformation types; and
- integrating, by said processor, said second image frame, comprising said transformed objects and said transformed segments, with said reference image frame to generate said panoramic background image.

18. The computer readable storage medium of claim 17, further comprising:
- identifying a moving object based on a comparison of the location of said object in said second image frame relative to said reference image frame; and
- cleaning of said reference image frame and said second image frame, by removal of said identified moving object and substitution of color data and depth data associated with background regions of said reference image frame and said second image frame, wherein said cleaning is performed prior to performing said transformation of said objects.

19. The computer readable storage medium of claim 17, further comprising determining if said segments are fully contained within a boundary of said second image frame prior to performing said transformation of said segments.

20. The computer readable storage medium of claim 19, further comprising, if said segments are not fully contained within said boundary:
- determining if a size of said segment exceeds a size threshold and a distance of said segment from said camera exceeds a distance threshold; and
- if said determination is true, performing a 2D transformation on said segment;
- otherwise removing said segment and substituting color data and depth data associated with background regions of said reference image frame and said second image frame.

21. The computer readable storage medium of claim 20, wherein said size threshold is in the range of 1 to 20 percent of the area of said second image frame, and said distance threshold is 10 meters or more from said camera.

22. The computer readable storage medium of claim 17, wherein said assigning of a transformation type to each of said segments is further based on depth error information associated with said pixels of said segment.

23. The computer readable storage medium of claim 17, wherein said 2D transformation comprises projective warping and interpolation, and wherein said 3D transformation comprises rotation and translation.

24. The computer readable storage medium of claim 17, further comprising resolving conflicts in said assignment of transformation of segments to both said 2D transformation type and said 3D transformation type, said resolution in favor of said 2D transformation type.

\* \* \* \* \*